United States Patent
Kurzweil

(10) Patent No.: US 10,223,821 B2
(45) Date of Patent: Mar. 5, 2019

(54) MULTI-USER AND MULTI-SURROGATE VIRTUAL ENCOUNTERS

(71) Applicant: Raymond C. Kurzweil, Mountain View, CA (US)

(72) Inventor: Raymond C. Kurzweil, Mountain View, CA (US)

(73) Assignee: Beyond Imagination Inc., Burank, CA (US)

( * ) Notice: Subject to any disclaimer, the term of this patent is extended or adjusted under 35 U.S.C. 154(b) by 0 days.

(21) Appl. No.: 15/496,213

(22) Filed: Apr. 25, 2017

(65) Prior Publication Data

US 2018/0308268 A1 Oct. 25, 2018

(51) Int. Cl.
G06T 11/60 (2006.01)
H04N 5/247 (2006.01)
G06T 7/70 (2017.01)

(52) U.S. Cl.
CPC .............. *G06T 11/60* (2013.01); *G06T 7/70* (2017.01); *H04N 5/247* (2013.01)

(58) Field of Classification Search
CPC .... G06F 3/016; G06F 3/04815; A63F 13/285; A63F 13/335; H04N 5/247; H04N 7/141; H04N 13/344; H04N 7/14; G06T 11/60; G06T 7/70; G06T 19/006
See application file for complete search history.

(56) References Cited

U.S. PATENT DOCUMENTS

| | | | |
|---|---|---|---|
| 613,809 A | 11/1898 | Tesla | |
| 5,103,404 A | 4/1992 | McIntosh | |
| 5,111,290 A | 5/1992 | Gutierrez | |
| 5,845,540 A | 12/1998 | Rosheim | |
| 5,980,256 A | 11/1999 | Carmein | |
| 5,984,880 A | 11/1999 | Lander et al. | |
| 6,368,268 B1 | 4/2002 | Sandvick et al. | |
| 6,583,808 B2 | 6/2003 | Boulanger et al. | |
| 6,695,770 B1 | 2/2004 | Choy et al. | |
| 6,726,638 B2 | 4/2004 | Ombrellaro | |

(Continued)

FOREIGN PATENT DOCUMENTS

WO WO00/59581 10/2000

OTHER PUBLICATIONS

Hasunuma et al., "Development of Teleportation Master System with a Kinesthetic Sensation of Presence", Retrieved from the Internet, p. 1-7, 1999.

(Continued)

*Primary Examiner* — Jingge Wu
(74) *Attorney, Agent, or Firm* — Fish & Richardson P.C.

(57) ABSTRACT

A virtual reality encounter system is described. A first surrogate supporting at least one first camera that captures image data from a first physical location and a second surrogate supporting at least one second camera that captures second image data from the first physical location. Aliasing substitution processing has a computing system including a processor receive the first image data and detect an image of the second surrogate in the first image data and replace the image data of the second surrogate in the first physical location, with image data of a user in the first physical location to form a transformed image that substitutes the image data of the user for the image data of the second surrogate.

34 Claims, 16 Drawing Sheets

(56) References Cited

U.S. PATENT DOCUMENTS

| | | |
|---|---|---|
| 6,741,911 B2 | 5/2004 | Simmons |
| 6,771,303 B2 | 8/2004 | Zhang et al. |
| 6,786,863 B2 | 9/2004 | Abbasi |
| 6,832,132 B2 | 12/2004 | Ishida et al. |
| 6,958,746 B1 | 10/2005 | Anderson et al. |
| 7,095,422 B2 | 8/2006 | Shouji |
| 7,124,186 B2 | 10/2006 | Piccionelli |
| 7,164,969 B2 | 1/2007 | Wang et al. |
| 7,164,970 B2 | 1/2007 | Wang et al. |
| 7,333,622 B2 | 2/2008 | Algazi et al. |
| 9,259,282 B2 * | 2/2016 | Azizian .................. A61B 6/102 |
| 9,479,732 B1 * | 10/2016 | Saleh .................... H04N 5/3572 |
| 9,841,809 B2 * | 12/2017 | Kurzweil ............. G06F 3/04815 |
| 2002/0049566 A1 | 4/2002 | Friedrich et al. |
| 2002/0080094 A1 | 6/2002 | Biocca et al. |
| 2002/0188186 A1 * | 12/2002 | Abbasi .................. A61B 5/486 |
| | | 600/380 |
| 2003/0030397 A1 | 2/2003 | Simmons |
| 2003/0036678 A1 * | 2/2003 | Abbassi ................ A61H 19/50 |
| | | 600/38 |
| 2003/0093248 A1 | 5/2003 | Vock et al. |
| 2003/0229419 A1 | 12/2003 | Ishida et al. |
| 2004/0046777 A1 | 3/2004 | Tremblay et al. |
| 2004/0088077 A1 | 5/2004 | Jouppi et al. |
| 2004/0104935 A1 | 6/2004 | Williamson et al. |
| 2005/0014560 A1 * | 1/2005 | Blumenthal ............ G06F 3/016 |
| | | 463/36 |
| 2005/0062869 A1 * | 3/2005 | Zimmermann ........ G02B 13/06 |
| | | 348/335 |
| 2005/0130108 A1 * | 6/2005 | Kurzweil ............... H04N 7/147 |
| | | 434/307 R |
| 2005/0131580 A1 * | 6/2005 | Kurzweil ................ B25J 13/00 |
| | | 700/245 |
| 2009/0081923 A1 | 3/2009 | Dooley et al. |
| 2009/0312871 A1 * | 12/2009 | Lee ......................... G01C 21/00 |
| | | 700/259 |
| 2012/0038739 A1 * | 2/2012 | Welch ................... H04N 13/388 |
| | | 348/14.01 |
| 2012/0045742 A1 * | 2/2012 | Meglan .................. G09B 23/28 |
| | | 434/268 |
| 2012/0167014 A1 * | 6/2012 | Joo .......................... G06F 3/01 |
| | | 715/849 |
| 2013/0250034 A1 * | 9/2013 | Kang ...................... H04W 4/02 |
| | | 348/14.02 |
| 2014/0057236 A1 * | 2/2014 | Meglan .................. G09B 23/30 |
| | | 434/268 |
| 2015/0258432 A1 * | 9/2015 | Stafford ................ A63F 13/213 |
| | | 463/32 |
| 2016/0041581 A1 * | 2/2016 | Piccionelli .............. G06F 1/163 |
| | | 345/156 |
| 2016/0275722 A1 | 9/2016 | Bretschneider et al. |
| 2017/0206710 A1 * | 7/2017 | Touma .................. G09G 3/2092 |
| 2017/0296897 A1 * | 10/2017 | Simpson ................ A63B 69/004 |
| 2017/0334066 A1 * | 11/2017 | Levine ..................... B25J 9/161 |

OTHER PUBLICATIONS

Kanehiro et al., "Virtual Humanoid Robot Platfrom to Develop Controllers of Real Humanoid Robots without Porting", IEEE, p. 1093-1099, 2001.

Hou et al., "Teleoperation Characteristics and Human Response Factor in Relation of a Robotic Welding System", IEEE, p. 1195-1202, 1999.

Kalra et al., "Real-Time Animation of Realistic Virtual Humans", IEEE, p. 42-56, 1998.

International Search Report and Written Opinion, PCT/US18/29043, dated Aug. 8, 2018.

* cited by examiner

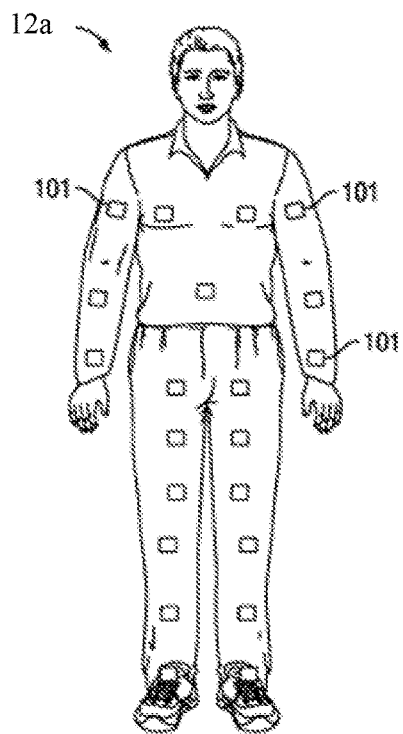
FIG. 7A
Prior Art
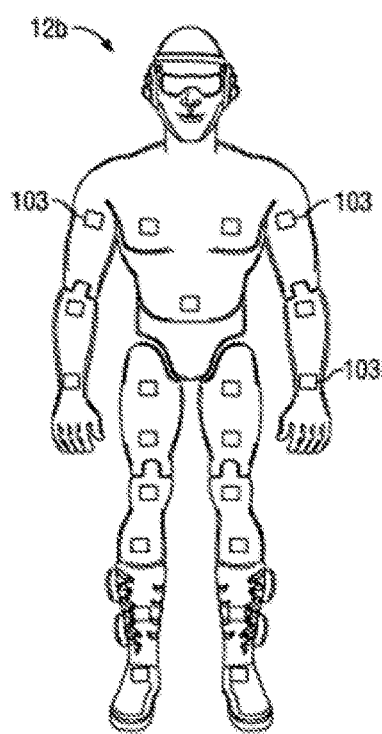
FIG. 7B
Prior Art
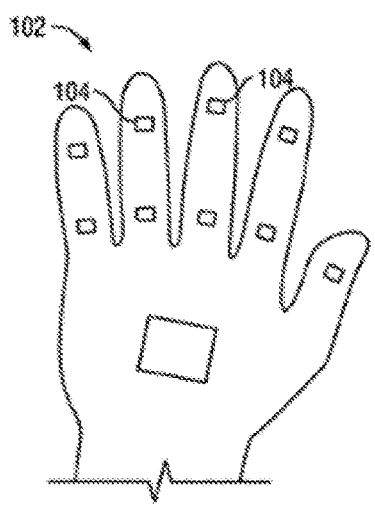
Prior Art   FIG. 8A
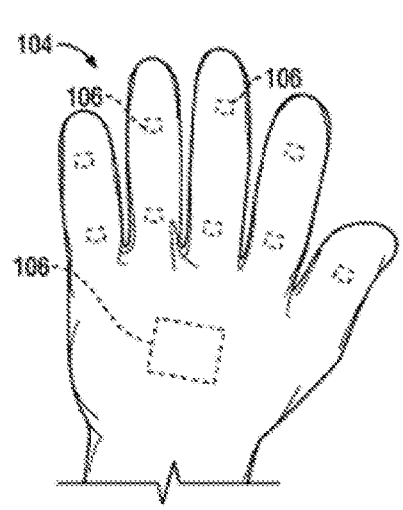
Prior Art   FIG. 8B

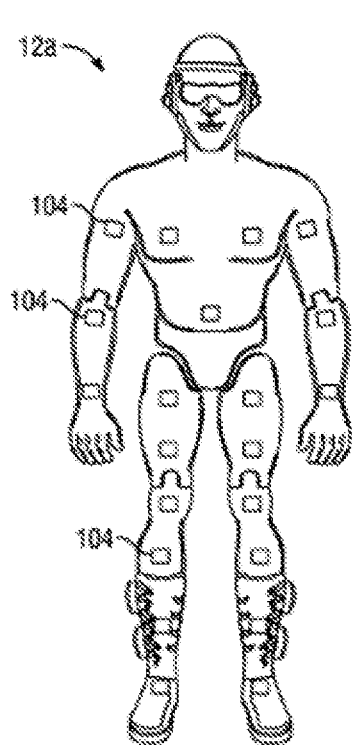 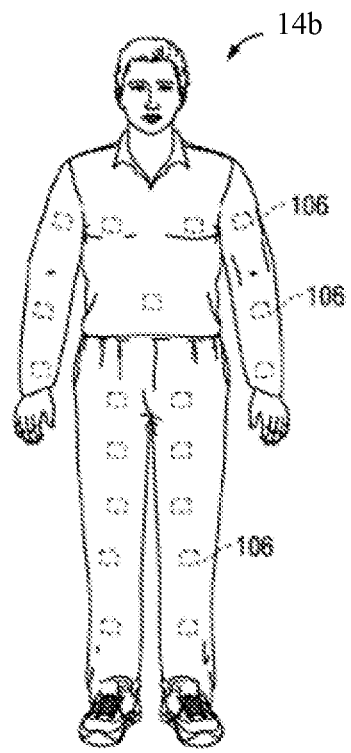
FIG. 9A  
Prior Art
FIG. 9B  
Prior Art

MULTI-USER AND MULTI-SURROGATE VIRTUAL ENCOUNTERS

BACKGROUND

This disclosure relates to virtual reality devices and systems for providing virtual encounters using virtual devices for communication, observation, and contact.

People can be separated by physical distances and yet can interact by conventional technologies such as telephones and teleconferencing. More recently with the advent of networking and especially the Internet people can hear each other's voice and see each other's images. Other developments have increased the perception of physical closeness.

For example, various types of virtual encounters are described in my published patent application US 2005-0130108 A1 published Jun. 16, 2005. In the published application, a mannequin or a humanoid-type robot can be deployed as a surrogate for a human. In one type of encounter, a mannequin can be paired with a remote set of goggles. In another type, the surrogate is configured such that a human with sensors can produce actuation signals that are sent to actuators to a remote robot to remotely control through the actuator signals movement of the robot. Conversely, in another type of encounter, a humanoid robot can be configured with sensors for sending sensor signals to a body suit having actuators that receive the sensor signals, such that a person wearing the body suit feels what the humanoid robot senses.

Also disclosed in other types of encounters is the use of a camera supported by a surrogate sending video images that are overlaid with a virtual scene, which images are rendered by goggles worn by a user, or in the video images can be morphed into a different image that is rendered by the goggles.

As also disclosed in my published application is the use of a pair of surrogates and a pair of humans that are configured such that a first one of the pair of humans in a first location has its own surrogate in a remote second location and through the surrogate can experience stimuli that occurs at the second location, whether those stimuli are tactile, auditory, visual, etc., and vice versa.

SUMMARY

The virtual encounters disclosed in the above mentioned published application involve pairings. Another type of virtual encounter is a multiple-paring type of virtual encounter that involves several (more than two) people at two locations interacting in the locations simultaneously in a common session. At each location there would be some number of surrogates (mannequin or robotic types). Each user would select/be assigned a remote surrogate, i.e., hereinafter referred to as a surrogate. Thus, each user will see out of that surrogate's eyes (e.g., camera), hear out of that surrogate's ears (microphone) and feel out of that surrogate's tactile sensors that are positioned anywhere and everywhere on the surrogate's body.

One problem with the multiple-paring type of virtual encounter is that if there are one or more additional surrogates at a given remote location (beyond the one surrogate that the user selected, e.g., the surrogate that the user sees/hears/feels out of and controls), then that user will see those other surrogates rather than the humans they represent. Described below are techniques that are used to modifying processing that a given user will see when the additional people (more than two) are also represented by a surrogate/robot. The techniques address the problem of a person via the "eyes," i.e., cameras, of the surrogate that represents the person, and seeing one of the other surrogates, having the person's view modified such that real time image modification replaces the image of the one of the surrogates with a corresponding image of the person that the surrogate represents.

According to an aspect, a virtual reality encounter system includes a first surrogate supporting at least one first camera that captures image data from a first physical location in which the first surrogate is disposed to produce a first image signal, a second surrogate supporting at least one second camera that captures second image data from the first physical location in which the second surrogate is disposed to produce a second image signal, a processor configured to receive the first image signal, detect an image of the second surrogate in the first image signal, replace the image data of the second surrogate in the first physical location, with image data of a user in the first physical location to form a transformed image that substitutes the image data of the user for the image data of the second surrogate, and a user device comprising a display and transducer, the user device disposed in the second location, with the display configured to receive the transformed image.

Other aspects include methods and computer program products stored on hardware storage devices that are non-transitory, and which include either volatile and/or non-volatile memory devices and storage devices.

A solution to the above problem is to apply real time image transformation, so that rather than users seeing surrogates (whether mannequins or robotic) at the remote location, users see the humans that the surrogates represent. In other words, the image is changed in real time so that the image of the surrogate is replaced with an image of the human that the surrogate represents. The image replace can include producing a series of images corresponding to movements of the associated human. One or more of the aspects above have one or more of the following advantages. The virtual encounter system adds a higher level of perception for groups of several people being perceived as being in the same place. Aspects of the system allow groups of two people to touch and to feel each other as well as manipulate objects in each other's environment. People can change their physical appearance in the virtual environment so that they seem taller or thinner to the other person or become any entity of their own choosing.

DESCRIPTION OF THE DRAWINGS

FIGS. 7A to 9B (prior art) are views of users and surrogates outfitted with tactile elements.

DESCRIPTION

Figure 1:
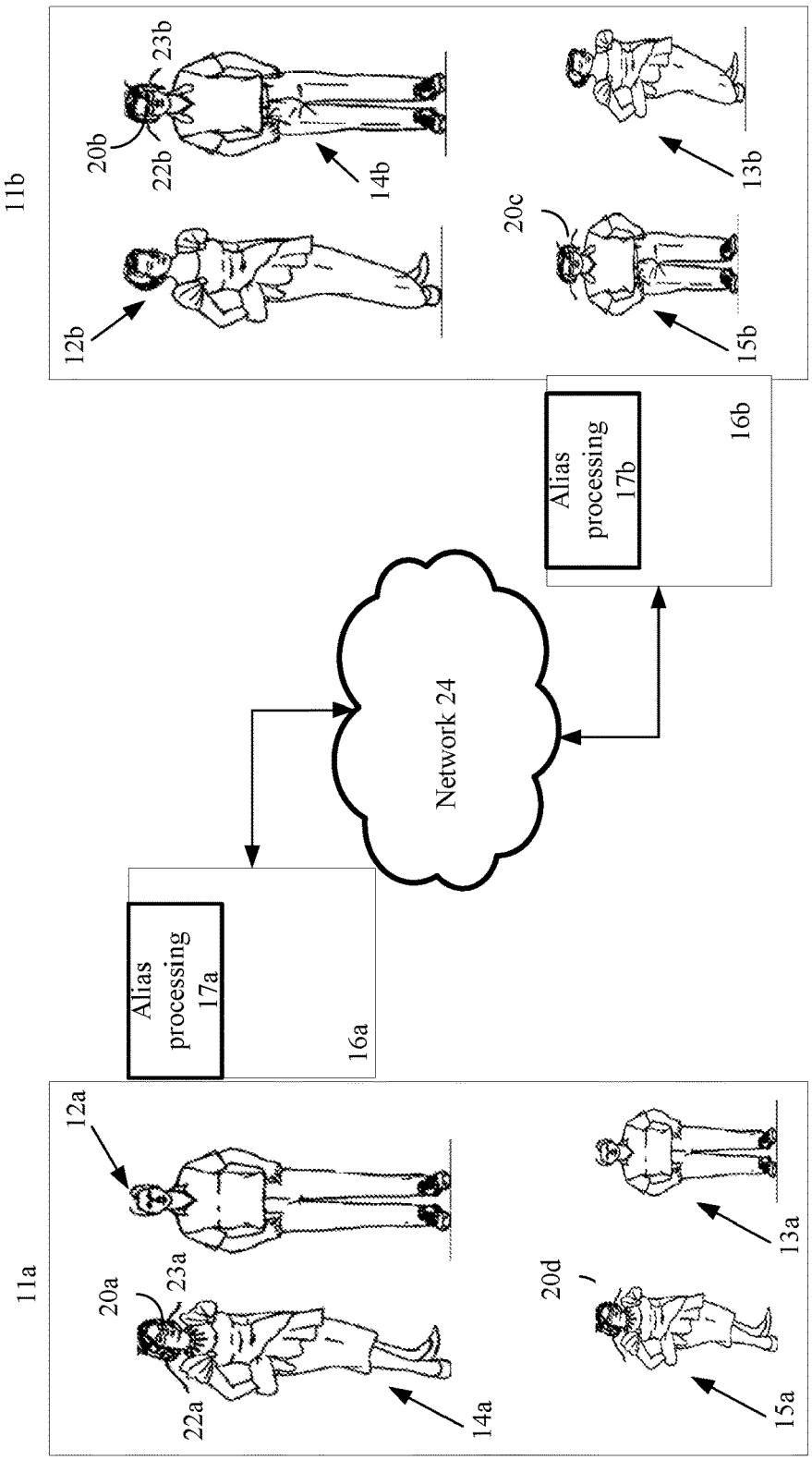
FIG. 1 is a diagrammatical view of a virtual encounter system.

Referring to FIG. 1, a virtual encounter system 10 includes in a first location 11a, a first surrogate 12a, a first user 14a, a first communication gateway 16a, a first set of goggles 20a worn by the first user 14a, and a first pair of wireless earphones (earphone 22a and earphone 23a) also worn by first user 14a. The virtual encounter system 10 also includes at least a second location 11b. In the second location 11b are a second surrogate 12b, a second user 14b, a second communication gateway 16b, a second set of goggles 20b worn by the second user 14b, and a second pair of wireless earphones (earphone 22b and earphone 23b) also worn by the second user 14b. Gateway 16a and gateway 16b are connected by a network 24 (e.g., the Internet).

As will be explained below, when user 14a interacts with surrogate 12a in location 11a by seeing and hearing through the surrogate 12a, the user 14a actually perceives seeing user 14b and hearing user 14b in location 11b. Likewise, user 14b listens and sees through surrogate 12b, but perceives listening and seeing user 14a in location 11a. Details of the gateways 16a and 16b are discussed below. Suffice it to say that the gateways 16a and 16b execute processes to process and transport raw data produced from devices for instance when users 14a and 14b interact with respective surrogates 12a and 12b. Suffice here to say that cameras and microphones carried on surrogates provide images and audio that are sent to user goggles, which allow a user to see and hear what a corresponding surrogate sees and hears.

In the discussion below, a user is considered "paired" with a surrogate, when the user and paired surrogate are in different locations (i.e., the surrogate in one location acts as a "stand in" that location in place of the user in the different location) and the user is considered "associated" with a surrogate, when that user and surrogate are physically in the same location and the user interacts with that surrogate in that same physical location.

Thus in FIG. 1, user 14a and surrogate 12b are "paired" as are user 14b and surrogate 12a, whereas user 14a is "associated" with surrogate 12a and user 14b is "associated" with surrogate 12b. During a session, a pairing is fixed whereas an association can vary.

Also shown in FIG. 1, are two additional sets of entities, one set in location 11a and the other set in location 11b. (In a practical application there can be many additional sets of entities in each of the locations, but for clarity only two additional sets are discussed herein.) Also in a practical application there can be more than two locations, but for clarity only two locations are discussed below. In location 11a there is an additional user 15a and an additional surrogate 13a. In location 11b there is an additional user 15b and an additional surrogate 13b. For this discussion, consider first only the additional entities (user 15b and surrogate 13b) in location 11b.

With respect to user 14a at location 11a, user 14a will see user 14b as above through surrogate 12b, but at times user 14a will also see surrogate 13b through surrogate 12b. It is desired that rather than seeing surrogate 13b, that user 14a see instead user 15a who is paired with surrogate 13b. That is user 14a sees surrogate 13b because user 14a while interacting with surrogate 12a in location 11a sees and hears what the surrogate 12b sees and hears, and thus when surrogate 12b has surrogate 13b in its field of view, user 14a perceives seeing surrogate 13b, and (if user 15b is also in the field of view also sees user 15b) at location 11b. In this instance, surrogate 12b sees surrogate 13b, but not user 15a.

To address this problem, the virtual encounter system 10 includes aliasing-substitution processing. In one implementation there is one aliasing-substitution processing module for the two set of locations.

In another implementation, there is an aliasing-substitution processing module at each gateway. In this latter implementation, each gateway system 16a, 16b includes an aliasing-substitution processing module 17a, 17b, respectively.

Aliasing-substitution processing modules 17a, 17b, process images received from surrogates in respective locations and perform a real time image transformation, so that rather than seeing a surrogate of another user at a remote location, the user sees the user that the surrogate represents. Essentially, the aliasing-substitution processing works in a similar manner whether there is one or multiple aliasing-substitution processing modules.

In other words, in the context of FIG. 1, the aliasing-substitution processing 17b receives images from the surrogate 12b and transforms portions of some of the images received from the surrogate 12b, in real time, by replacing those portions of the received images that have the surrogate 13b in the images, with images of the user 15a that the surrogate 13b represents. That is, the aliasing-substitution processing 17b replaces the surrogate 13b images with images of the paired user 15a in location 11a. This replacement could be a static replacement, meaning that the same image could be used in all replacements and ignoring any movements of the associated human user or the replacement could be dynamic replacement, meaning that the replacement of the image would include images corresponding to movement of the associated human user.

In either case, images of the surrounding scene (and in particular in regions of intersection between a background and the image of the person) may need to be repaired so that the images do not look jagged or unusual. A pixel based aliasing processing can be used for repair to these intersections to remove jagged edges and blend in the image with the background. The images that are rendered by the goggles worn by user 14a while interacting with surrogate 12a, and seeing through surrogate 12b in location 11b, would render not the surrogate 13b but the user 15a. Techniques to accomplish this are described below.

With respect to user 14b, user 14b will see user 14a at location 11a through surrogate 12a in location 11a and user 14b will also see surrogate 13a rather than user 15b. Again, this problem can be addressed by the virtual encounter system 10 performing aliasing-substitution processing with aliasing-substitution processing module 17a to perform a real time image transformation, so that rather than the user 14b seeing the surrogate 13a of the user 15b at remote location 11b, the user 14b sees the user 15b that is paired with the surrogate 13a.

In the implementation of a single aliasing-substitution processing module (not shown) that module would perform the functions that are performed by aliasing-substitution processing module 17a and aliasing-substitution processing module 17b.

As with the aliasing-substitution processing 17b, aliasing-substitution processing 17a receives images from the surrogate 12a and transforms the images received from the surrogate 12a in real time with either a static or dynamic replacement, meaning that the same image could be used in all replacement or replacement could be dynamic, meaning that the replacement would capture movement of the associated human user. In either case, again the surrounding scene may need to be repaired so that the images do not look jagged or unusual. Thus, the images that are rendered by the goggles worn by user 14b while interacting with surrogate 12b, and seeing through surrogate 12a in location 11a, would render not the surrogate 13a but the user 15b.

Figure 2A:
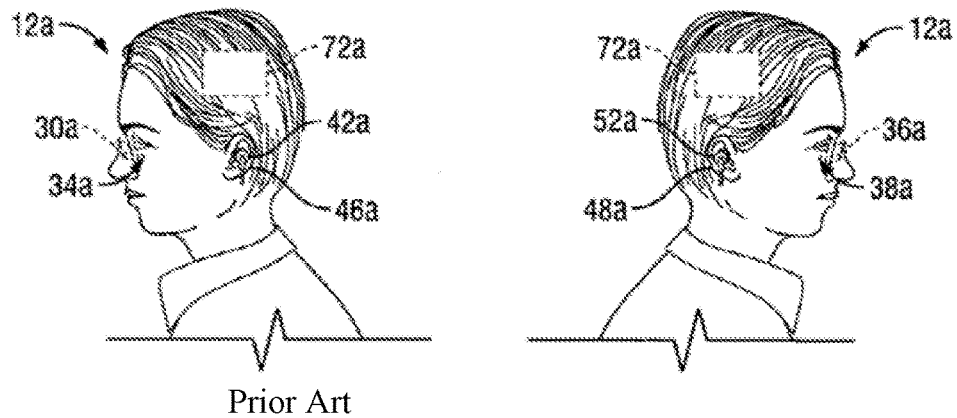
FIG. 2A (prior art) is a view of a left side and a right side of a head of a first surrogate in FIG. 1.
Figure 2B:
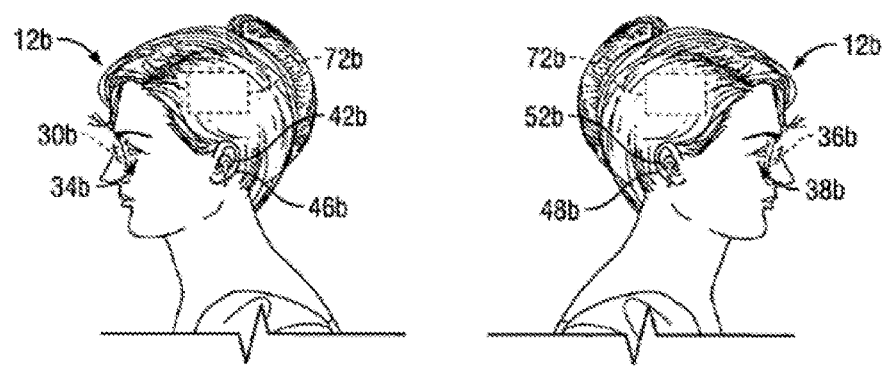
FIG. 2B (prior art) is a view of a left side and right side of a head of a second surrogate in FIG. 1.

Referring to FIGS. 2A and 2B, each surrogate 12a-12b includes a camera (e.g., camera 30a and camera 30b) positioned in left eye sockets 34a and 34b, respectively and a camera (e.g., camera 36a and camera 36b) positioned in right eye sockets 38a and 38b, respectively. Each surrogate 12a-12b also includes a microphone (e.g., microphone 42a and microphone 42b) positioned within left ears 46a and 46b), respectively and a microphone (e.g., microphone 48a and microphone 48b) positioned within right ears 52a and 52b, respectively. Each surrogate 12a-12b further includes a transmitter (e.g., transmitter 72a and transmitter 72b) containing a battery (not shown). Transmitters 72a-72b send the audio and video signals from the cameras and the microphones to communication gateway 16a-16b.

Figure 2C:
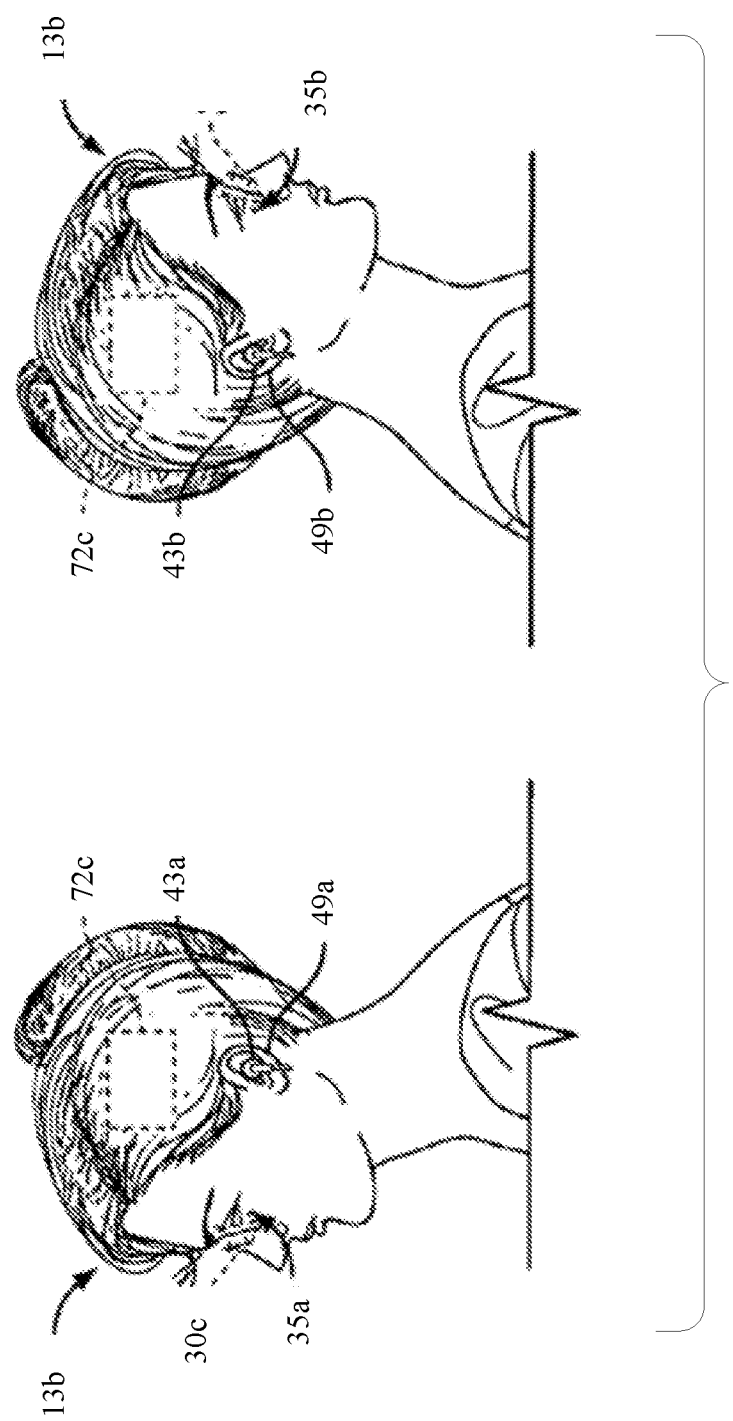
FIG. 2C is a view of left and right sides of a third surrogate in FIG. 1.

Referring to FIG. 2C, surrogate 13b includes cameras 35a, 35b, positioned in respectively left and right eye sockets (not referenced), microphones 49a, 49b positioned respectively within left/right ears (43a, 43b), as discussed above, as well as a transmitter 72c (similar to surrogate 12b).

Figure 3:
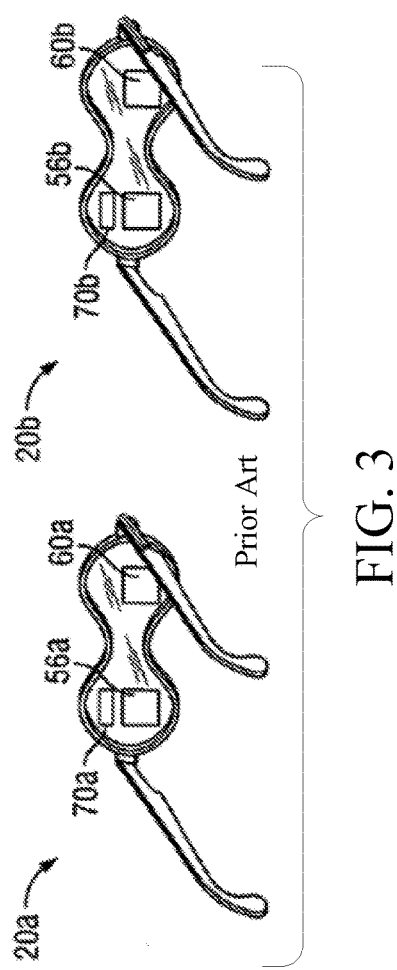
FIG. 3 (prior art) is a view of a set of virtual glasses typically worn by users.

Referring to FIG. 3, each set of goggles 20a and 20b, 20c and 20d (FIG. 1) includes one left display (left display 56a and left display 56b (not shown for goggles 20c and 20d) and one right display (right display 60a and right display 60b (not shown for goggles 20c and 20d). Each set of goggles 20a and 20b includes a receiver, e.g., receiver 70a and receiver 70b, (not shown for goggles 20c and 20d) containing a battery source (not shown). Receivers 70a-70b receive the audio and video signals transmitted from processors 16a-16b, whereas receivers for goggle 20c would receive audio from location a paired surrogate. Goggles 20c and 20d thus can be similarly constructed as goggles 20a and 20b and receive audio and video signals from a paired surrogate.

Figure 4:
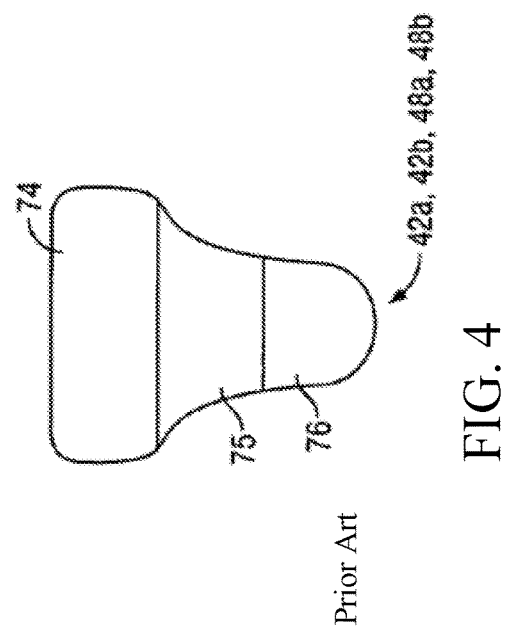
FIG. 4 (prior art) is a view of a wireless earphone typically worn by users.

Referring to FIG. 4, each earphones 24a, 24b, 26a and 26b for users 14a, 14b includes a receiver 74 for receiving audio signals from a corresponding microphone 42a, 42b, 48a and 48b an amplifier 75 for amplifying the audio signal and a transducer 76 for broadcasting audio signals. Earphones for a user 15b that may be paired for instance with surrogate 13a are similar to earphones 24a, 24b, 26a and 26b.

Figure 5:
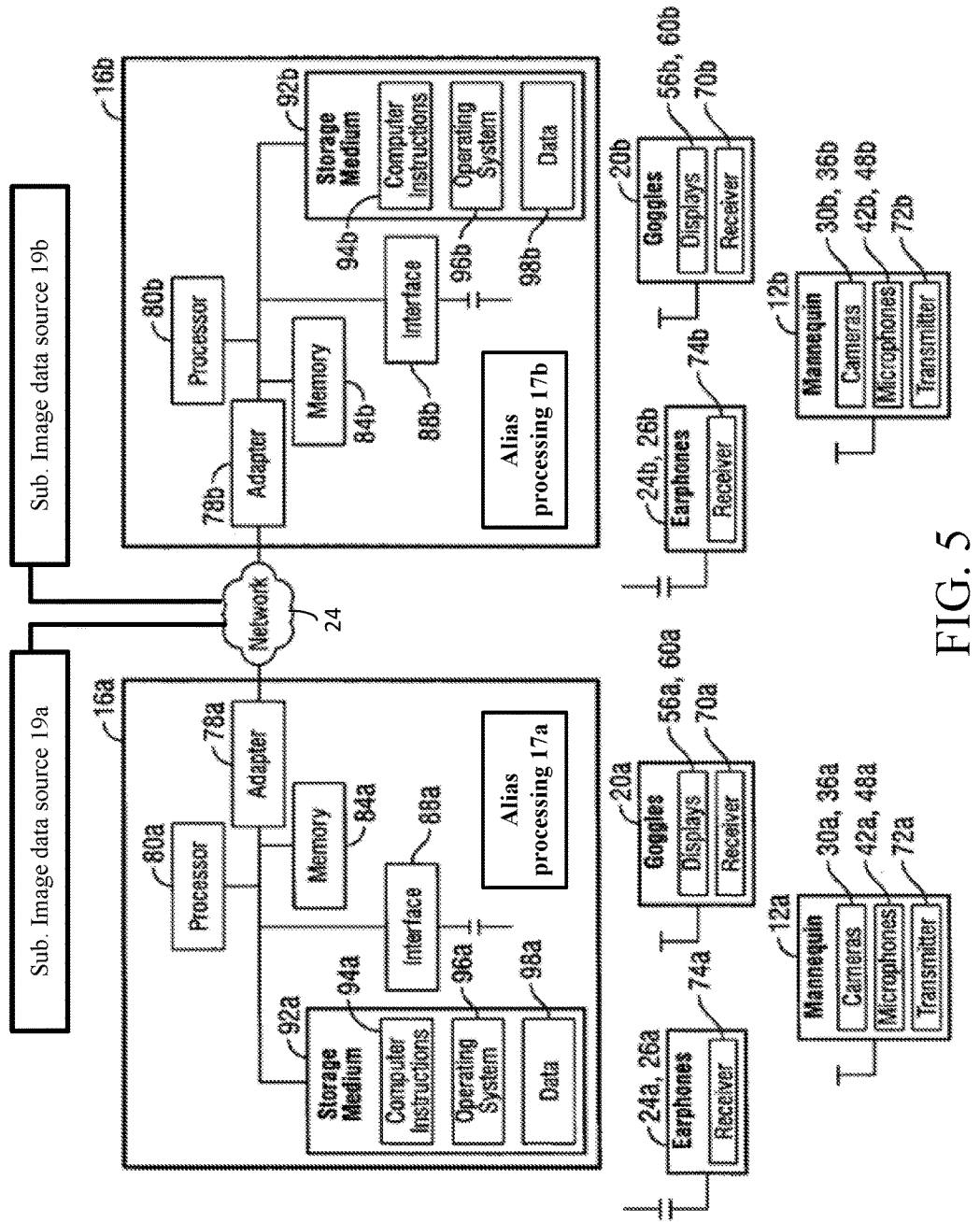
FIG. 5 is a functional diagram of the virtual encounter system with aliasing-substitution processing.

Referring to FIG. 5, each communication gateway 16a-16b includes an adapter 78a-78b, a processor 80a-80b, memory 84a-84b, an interface 88a-88b and a storage medium 92a-92b (e.g., a hard disk, flash memory, etc.). Each adapter 78a-78b establishes a bi-directional signal connection with network 24. Each interface 88a-88b receives, via transmitter 72a-78b in surrogate 12a-12c, video signals from cameras 30a-30b, 36a-36b and cameras (not shown) from surrogate 13b, audio signals from microphones 42a-42b, 48a-48b. Each interface 88a-88b sends video signals to displays 56a, 56b in goggles 20a-20b via receiver 70a-70b. Each interface 88a sends audio signals to earphones 24a-24b, 26a-26b in goggles 20a-20b via receiver 74a-74b. Each storage medium 92a-92b stores an operating system 96a-96b, data 98a-98b for establishing communications links with other communication gateways, and computer instructions 94a-94b which are executed by processor 80a-80b in respective memories 84a-84b to coordinate, send and receive audio, visual and other sensory signals to and from network 24. Signals within system 10 are sent using a standard streaming connection using time-stamped packets or a stream of bits over a continuous connection. Other examples, include using a direct connection such as an integrated services digital network (ISDN). Also shown in FIG. 5 are alias processing 17a and 17b modules that receive image data for substation from sources 19a, 19b, as will be described below.

Figure 6:
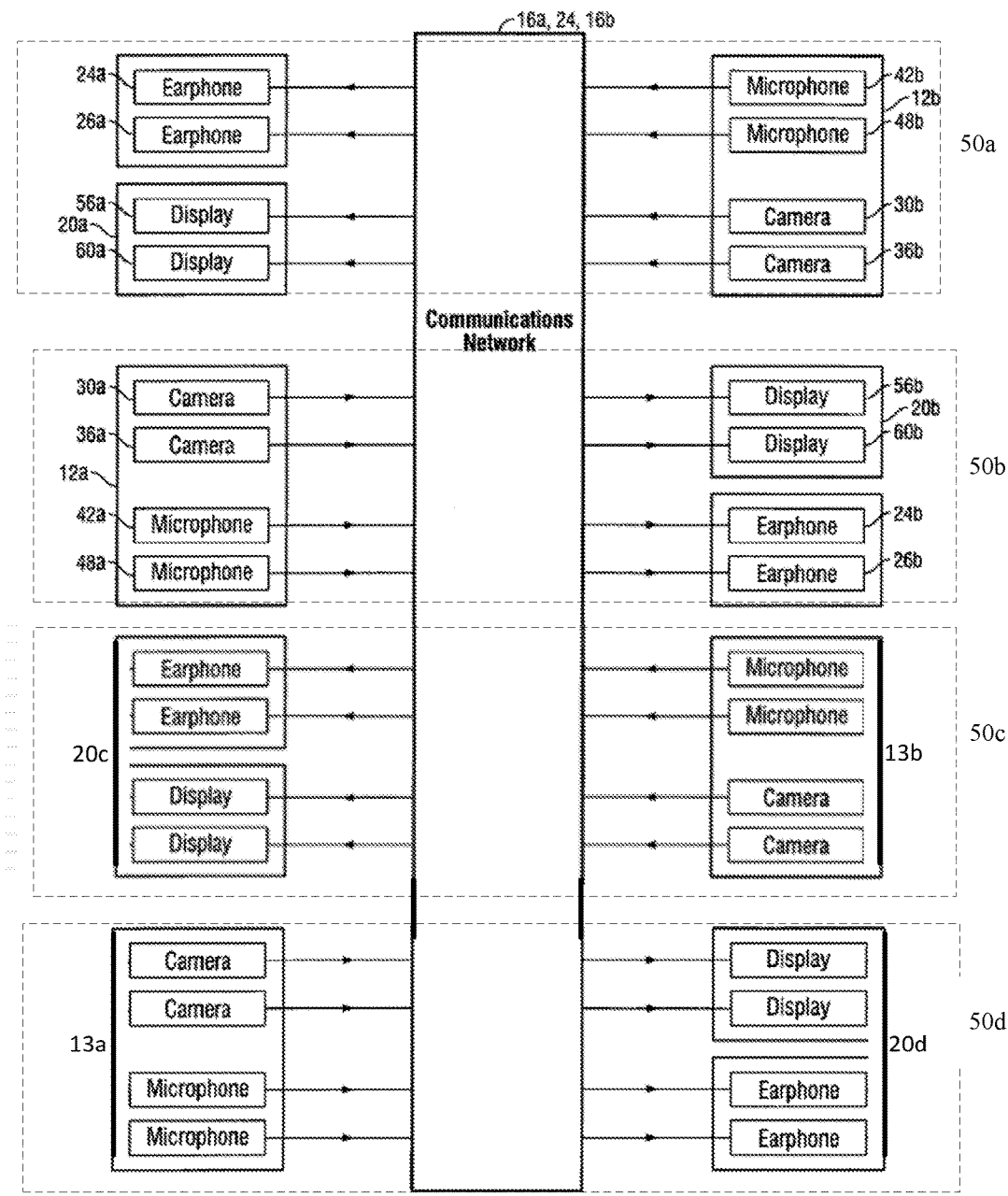
FIG. 6 is a signal flow diagram of the virtual encounter system with aliasing-substitution processing.

Referring to FIG. 6, first and second communication channels 50a, 50b are shown. These channels communicate through gateways (not explicitly shown in FIG. 6). In operation, camera 30b and camera 36b (in surrogate 12b) record video images from location 11b. The video images are transmitted wirelessly to communication gateway 16b as video signals. Communication gateway 16b sends the video signals through network 28 to communication gateway 16a. Communication gateway 16b transmits the video signals wirelessly to set of goggles 20a. The video images recorded by camera 30b are rendered on to display 56a, and the video images recorded on camera 36b are rendered on to display 60a.

Likewise, communication gateway 16a and communication gateway 16b work in the opposite direction through network 24, so that the video images, from location A, recorded by camera 30a are rendered on to display 56b. The video images, recorded by camera 36a are rendered on display 60b. The sounds received by microphone 42a in location A, are transmitted to earphone 24b and sounds received in location 11a by microphone 52a are transmitted to earphone 26b. The sounds received by microphone 42b in location 11b, are transmitted to earphone 24a and sounds received in location 11b by microphone 52b are transmitted to earphone 26a. Using system 10, two people can have a conversation where each of the persons perceives that the other is in the same location as them.

Also shown in FIG. 6 are a third channel 50c and a fourth channel 50d for goggles 20c, 20d and surrogates 13a, 13b, respectively. Using system 10, two people or four people can have conversations where each of the persons perceives that the other is in the same location as them through the paired surrogates.

In operation, camera 30b and camera 36b record video images from location 11b. The video images are transmitted wirelessly to communication gateway 16b as video signals. Communication gateway 16b sends the video signals through network 28 to communication gateway 16a. Communication gateway 16b transmits the video signals wirelessly to set of goggles 20a. The video images recorded by camera 30b are rendered on to display 56a, and the video images recorded on camera 36b are rendered on to display 60a.

Likewise, communication gateway 16a and communication gateway 16b work in the opposite direction through network 24, so that the video images, from location A, recorded by camera 30a are rendered on to display 56b. The video images, recorded by camera 36a are rendered on display 60b.

The sounds received by microphone 42a in location A, are transmitted to earphone 24b and sounds received in location 11a by microphone 52a are transmitted to earphone 26b. The sounds received by microphone 42b in location 11b, are transmitted to earphone 24a and sounds received in location 11b by microphone 52b are transmitted to earphone 26a.

Similar considerations apply for channels 50c and 50d with respect to users 15a, 15b and surrogates 13a and 13b.

Referring now to FIGS. 7A to 9B, and as shown and explained in more detail in my published patent application US 2005-0130108 A1 published Jun. 16, 2005 that is incorporated herein by reference in its entirety, are various other features.

For example, as shown in FIGS. 7A, 7B users, e.g., 14a can wear motion sensors 101 over portions of their bodies, and in particular over those portions of their bodies that exhibit movement. In addition, while surrogates 12b can be mannequins, in some implementations, the surrogates are robots (generally 12') that include a series of motion actuators 103 (FIG. 7B). Each motion actuator 103 placement corresponds to a motion sensor 101 on the user 14a so that each motion sensor 101 activates a motion actuator in the robot 12' that makes the corresponding movement. For example, when the user moves 103 their right hand, a sensor in the right hand sends a signal through the network to a motion actuator 103 on the robot 12b'. The robot 12b' in turn moves its right hand. In another example, a user 14a can walk towards a robot in location 11a. Sensors on the user 14a send a corresponding signal to the actuators 103 on the robot 12b'. A robot 12a' in the location performs the same walking movement.

As shown in FIGS. 8A-8B, tactile sensors 104 are placed on the exterior of a robot hand located in location 11a. Corresponding tactile actuators 106 are sewn into an interior of a glove worn by a user in location 11b. Using system 10, a user in location 11b can feel objects in location 11a. For example, a user can see a vase within a room, walk over to the vase, and pick-up the vase. The tactile sensors-actuators are sensitive enough so that the user can feel the texture of the vase.

As shown in FIGS. 9A, 9B, in other embodiments, sensors 104 are placed over various parts of a robot 12a'. Corresponding actuators 106 can be sewn in the interior of a body suit that is worn by a user 14b. The sensors 104 and their corresponding actuators 106 are calibrated so that more sensitive regions of a human are calibrated with a higher degree of sensitivity.

In other embodiments, user 14a can receive an image of a user 14b, but the actual background behind user 14b is altered. For example, user 14b is in a room but user 14a perceives user 14b on a beach or on a mountaintop (not shown). Using conventional video image editing techniques, the communication gateway 16a processes the signals received from location 11b and removes or blanks-out the video image except for the portion that has the user 22b. For the blanked out areas on the image, the communication gateway 16a overlays a replacement background, e.g., virtual environment to have the user 14b appear to user 14a in a different environment, as generally described in the above incorporated by reference published application. Generally, the system can be configured so that either user 14a or user 14b can control how the user 14b is perceived by the user 14a. Communication gateway 16a using conventional techniques can supplement the audio signals received with stored virtual sounds. For example, waves are added to a beach scene, or eagles screaming are added to a mountaintop scene, as generally described in the above incorporated by reference published application.

In addition, gateway 16a can also supplement tactile sensations with stored virtual tactile sensations. For example, a user can feel the sand on her feet in the beach scene or a cold breeze on her cheeks in a mountain top scene, as generally described in the above incorporated by reference published application. In this embodiment, storage media store data for generating a virtual environment including virtual visual images, virtual audio signals, and virtual tactile signals. Computer instructions executed by processor out of memory combine the visual, audio, and tactile signals received with the stored virtual visual, virtual audio and virtual tactile signals in data, as generally described in the above incorporated by reference published application.

In other embodiments, a user 14a can receive a morphed image of user 22b. For example, an image of user 14b is transmitted through network 24 to communications gateway 16a. User 14b has brown hair, brown eyes and a large nose. Communications gateway 16a again using conventional imaging morphing techniques alters the image of user 14b so that user 14b has blond hair, blue eyes and a small noise and sends that image to goggles 20a to be rendered. Communication gateway 16a also changes the sound user 14b makes as perceived by user 14a. For example, user 14b has a high-pitched squeaky voice. Communication gateway 22b using conventional techniques can alter the audio signal representing the voice of user 14b to be a low deep voice. In addition, communication gateway 16a can alter the tactile sensation. For example, user 14b has cold, dry and scaling skin. Communications gateway 16a can alter the perception of user 14a by sending tactile signals that make the skin of user 14b seem smooth and soft, as generally described in the above incorporated by reference published application.

In this embodiment, storage media store data for generating a morph personality. Computer instructions executed by a processor out of memory combine the visual, audio, and tactile signals received with the stored virtual visual, virtual audio and virtual tactile signals of a personality in data. Thus using system 10 anyone can assume any other identity if the identity data are stored in the storage media. In other embodiments, earphones are connected to the goggles. The goggles and the earphones are hooked by a cable to a port (not shown) on the communication gateway.

Aliasing-substitution processing 17a will now be described. Aliasing-substitution processing 17a would be similar. In the processing discussed below, the image data that will substitute for images captured by surrogates is communicated over the network to the proper aliasing-substitution processing module 17a, 17b, etc.

Figure 10:
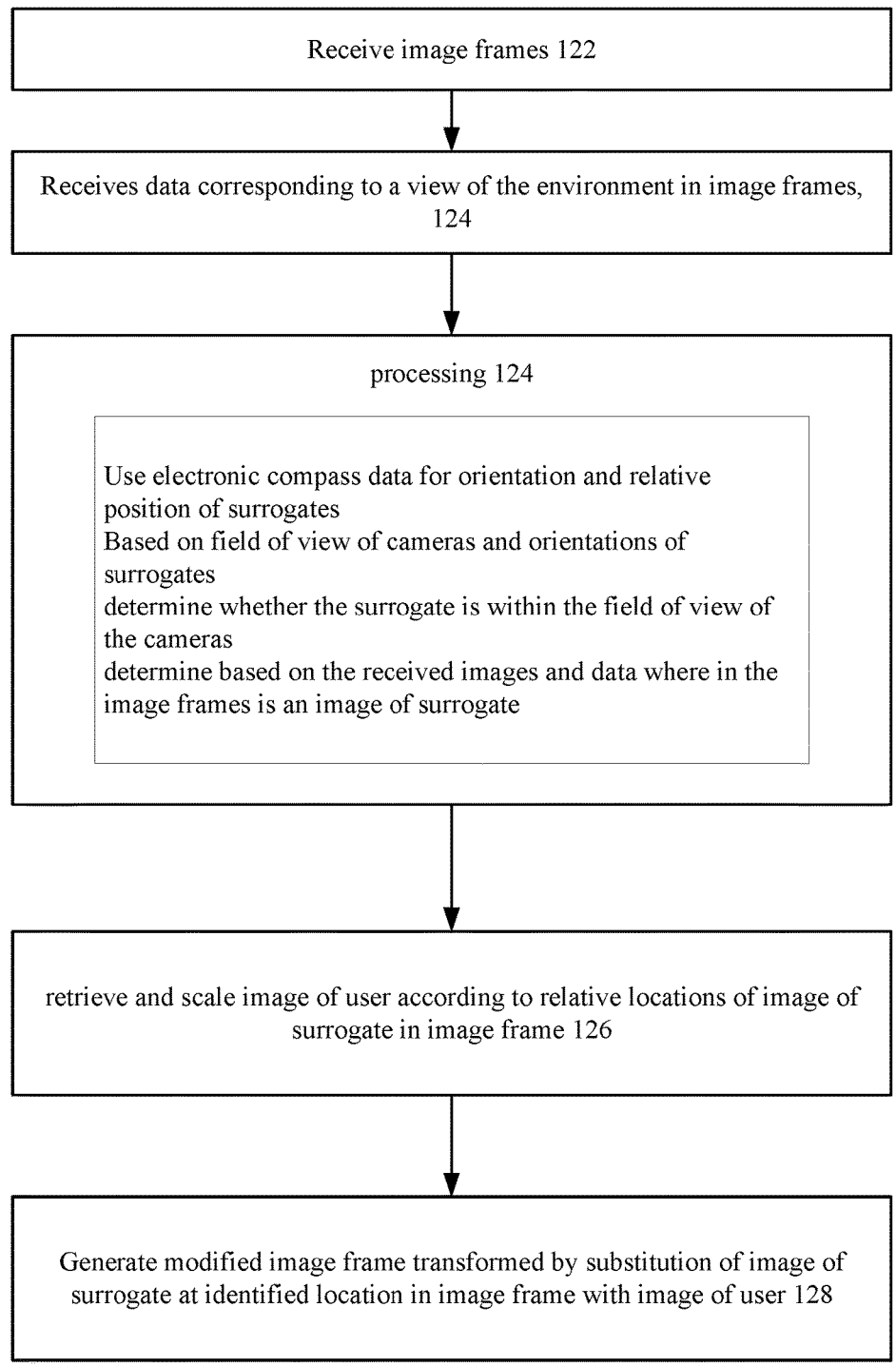
FIG. 10 is a flow chart depict aliasing-substitution processing.

Referring to FIG. 10, the aliasing-substitution processing 17b in the gateway 16b is shown. The aliasing-substitution processing 17b receives 122 image frames from the output of the cameras carried by surrogate 12b and receives 124 image data corresponding to a current view of the environment, as seen through the cameras carried by the surrogate 12b, e.g., a room containing the location, as viewed by the surrogate 12b for each frame. The image frames and data are processed 126 by the aliasing-substitution processing 17b. Each of the surrogates in FIG. 1 can be fitted with an electronic compass (not shown). The compass will give orientation and relative position of each of the surrogates. By knowing a field of view of the cameras and the orientations of surrogates 12b and 13b, the aliasing-substitution processing can determine whether the surrogate 13b is within the field of view of the cameras carried by surrogate 12b and hence would appear in the image frames. The aliasing-substitution processing 17b also receives 74 information that specifies the physical locations of each of the surrogates 12b and 13b. The aliasing-substitution processing 17b determines based on the received image frames and data where in the image frames the image of surrogate 13b would occur, retrieves 126 image data of user 15a and scales the retrieved image 108, and generates 128 transformed image that is a modified image frame transformed by substituting the image data of the surrogate 13b with the retrieved and scaled image data of user 15a.

That is, this aliasing-substitution processing 17b can substitute already captured images of the user, e.g., user 15a associated with the particular surrogate 13b, and modify the images to represent that user 15a at a viewing angle determined from the compass data, etc. in images that are returned to user 14a, so that user 14a at times sees user 15a rather than user's 15a paired surrogate 13b. The viewing angle is an angular two dimensional (or three dimensional) direction between the particular surrogate 12b and the surrogate 13b. This viewing angle is determined via the compass data. While this approach may not fully capture the real time movement and expressions of the human (unless a high degree of image modification were used), it would address the problem of viewing of surrogates in a multi-surrogate environment.

As described here aliasing-substitution processing 17b substitutes image data going to location 11a. In other implementations aliasing-substitution processing 17b could be configured to substitute for image data coming from location 11a. Similar considerations apply for aliasing-substitution processing 17a.

In one embodiment, in addition to providing the aliasing-substitution processing 17b, the system provides morph processing (not referenced) to generate from the received images of location 11b, a real-world image depicting the environment or a morphed or virtual depiction of the environment.

An alternative mechanism for producing the generated image frames augmented with a transformation of that portion of the image containing the surrogate 13b will now be described.

Figure 11A:
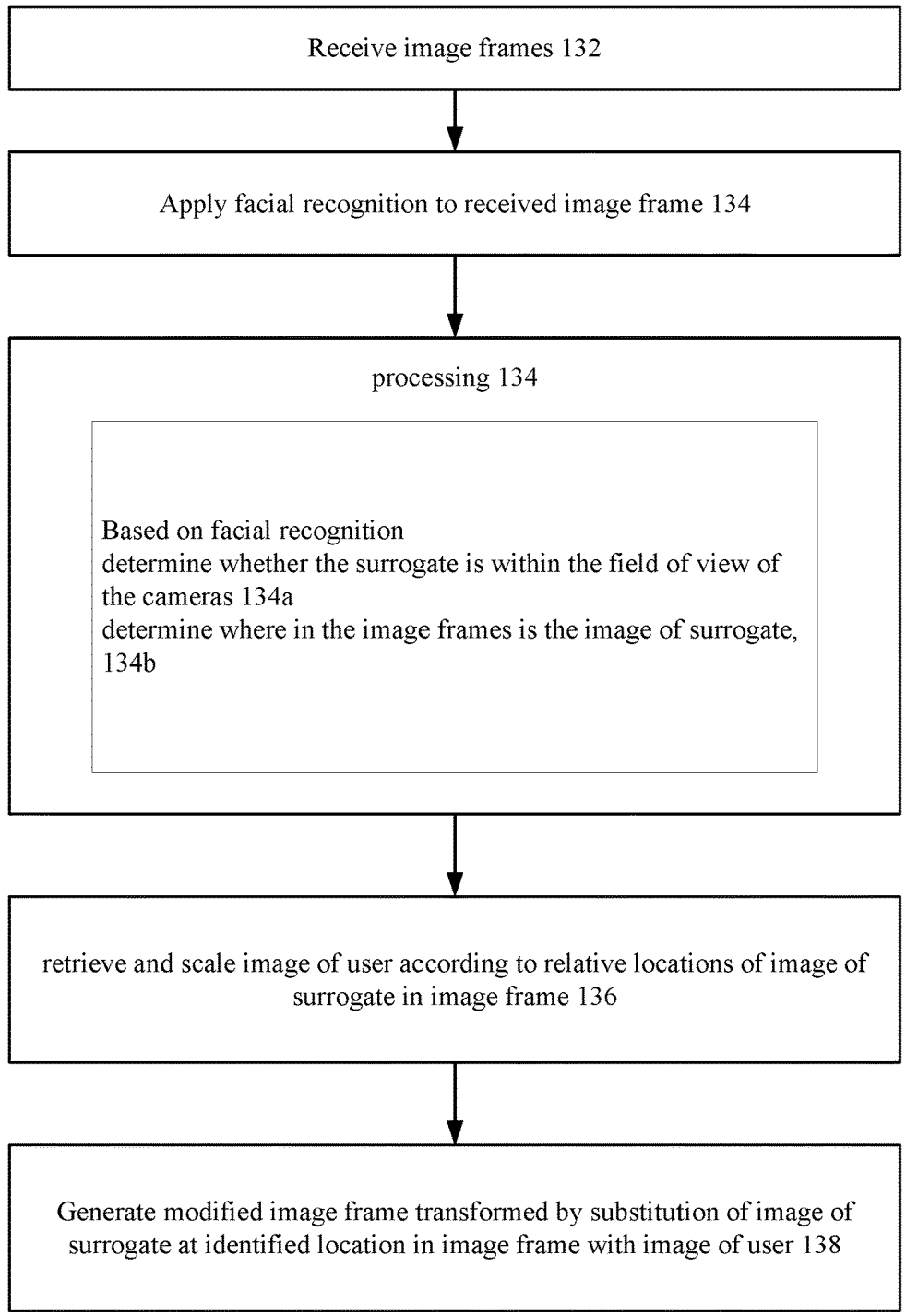
FIG. 11A is a flow diagram of arrangement for aliasing-substitution processing.

Referring now to FIG. 11A, an application of recognition processing to the received set of images is shown. This aliasing-substitution processing 17b' can be invoked when the compasses give orientations of the surrogates together with the field of view of the cameras on surrogate 12b indicate that surrogate 13b will appear in the images. Alternatively, aliasing-substitution processing 17b can be invoked for each image frame.

Image frames are received 132. In this embodiment, aliasing-substitution processing 17b is invoked for each image frame. Any of several well-known recognition techniques can be applied 134 to determine whether 134a and where 134b in the image the surrogate 13b appears. The processing 134 detects the image of the surrogate and retrieves 136 an image of the user, which is scaled (can also be cropped), according to the orientation data and the data corresponding to a current view of the environment, e.g., a room containing the location, as viewed by the surrogate 12b, to fit the retrieved image into the image frame and replace the image of the surrogate 13b. This aliasing-substitution processing 17b' generates 138 a modified image frame transformed by substitution of image of surrogate at identified location in the image frame with scaled and/or cropped image of user 15a.

For facial recognition one approach would be to compare selected facial features that are retrieved from the image to stored facial features of the surrogate. The aliasing-substitution processing upon detecting in the image the recognized surrogate will use the real-world view of the environment to delineate the extent of the surrogate and substitute that data for data corresponding to an image of the user.

Additional positional information can be obtained via beacons that send out r.f., optical or acoustic signals and using conventional triangulation techniques through a receiver on the surrogates the positional information of the receiver and hence the surrogates can be determined from the set of beacons and determine the relative positions of the surrogates. The aliasing-substitution processing can receive this positional information to determine the relative position of the surrogates, whether the surrogate appears in a view and where in an image frame the image of the surrogate would be located in the environment to position the substituted image of the user 15a into the image frame.

Figure 11B:
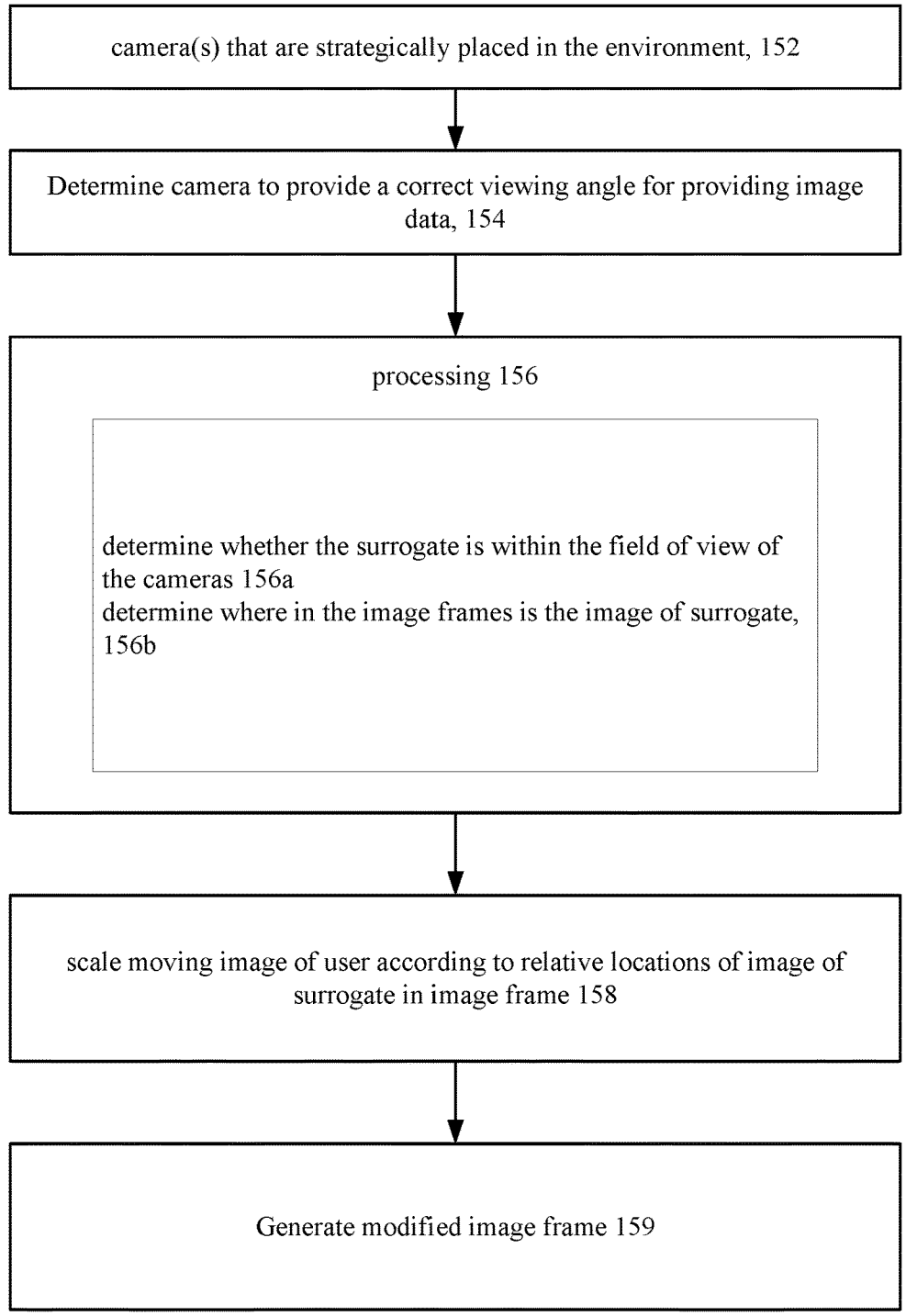
FIG. 11B is a flow diagram of an alternative arrangement for aliasing-substitution processing.

Referring now to FIG. 11B, one variation on the above approaches is to replace the image of the surrogate 13b with a real time image of the user 15a that the surrogate 13b represents. In this variation one or more cameras are set up or arranged in an environment to capture in real time a moving digital image of the user through that environment. The camera(s) are video camera(s) that are strategically placed in the environment so that a correct viewing angle of the surrogate 12b with respect to the user 15a is determined. The moving image data are sent to the specific aliasing-substitution module that is performing the processing.

In one implementation, the compass data can be used to select which camera is used to supply the real-time moving image data. In another implementation, the cameras can be mounted on a swivel mount and can either be manually controlled or automatically controlled to track movements of the user. Either approach can be used in order to obtain the correct viewing angle with regard to the user 15b.

The arrangement thus can be either a single video camera or a set of video camera, suitably arranged such as in a ring of cameras is provided. The selected real-time image data is then used to substitute for images of the surrogate as discussed above. In this processing, 156, the aliasing-substitution module would determine whether the surrogate 13b is within the field of view of the cameras 156a in the surrogate 13b and determine where in the image frames is the image of surrogate 13b, 156b.

The aliasing-substitution module can scale 158 the moving image and generate 159 a modified image that depicts movement of the user 15b rather than the user's 15b associated surrogate 13b. This second approach would more fully capture the real time movement and expressions of the human (albeit at the expense of more complexity) that the approaches discussed above.

Figure 12:
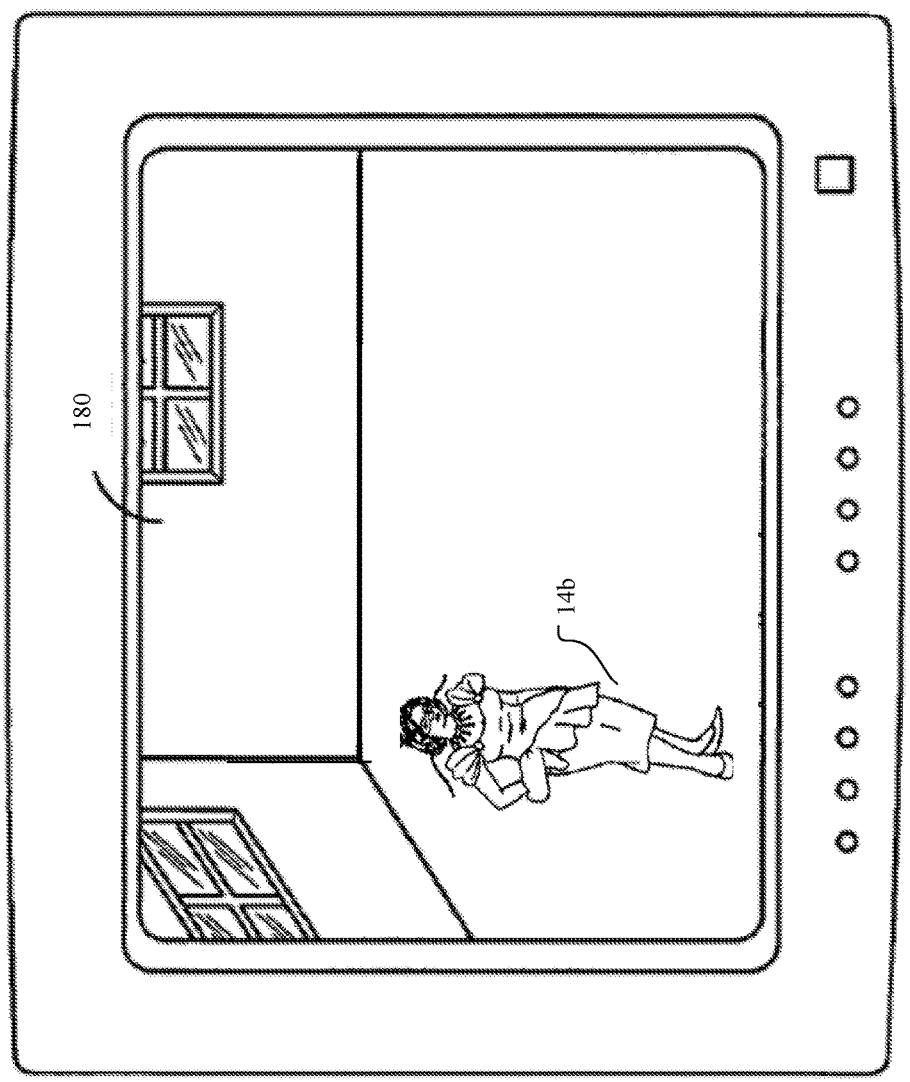
FIG. 12 is a view of an image of a first user, as perceived by a second user.
Figure 13:
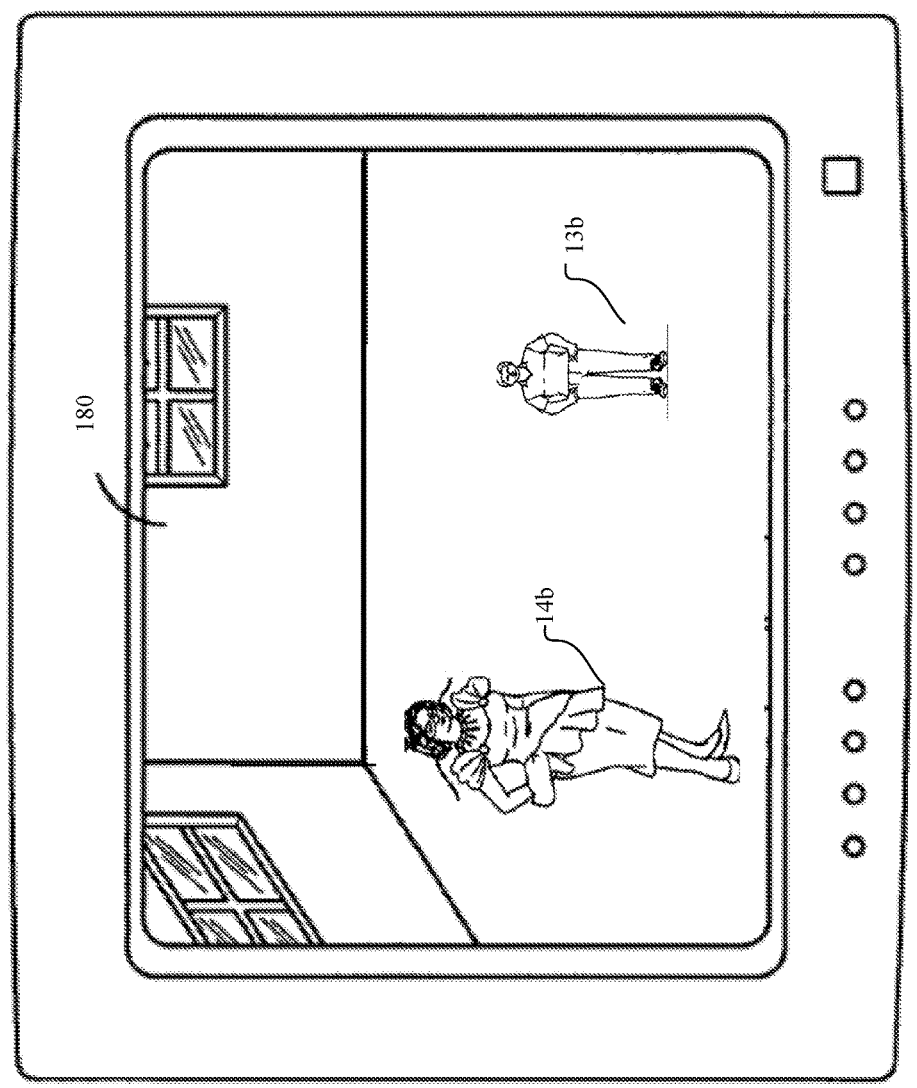
FIG. 13 is a view of an image of the first user and a surrogate, as perceived by the second user.
Figure 14:
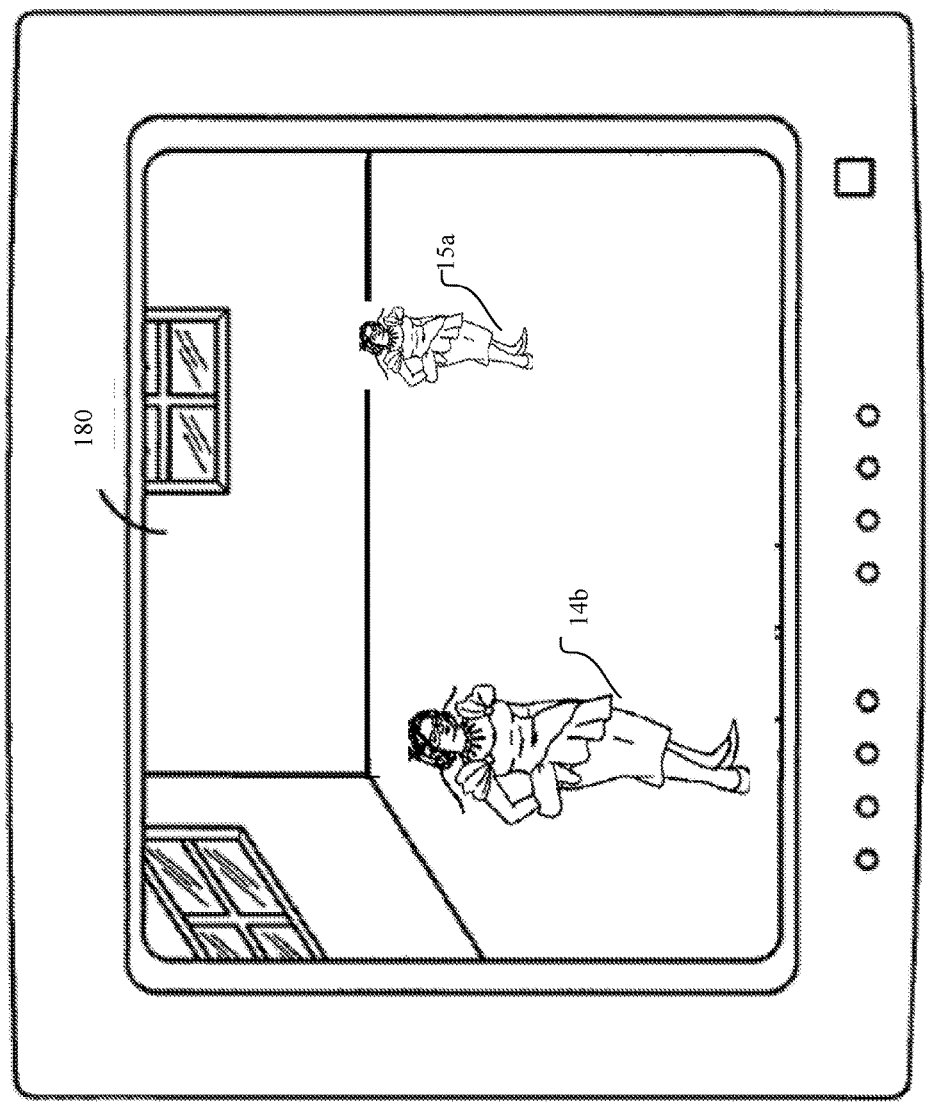
FIG. 14 is a view of an image of the first user and a third user substituted for its surrogate, as perceived by the second user.

Referring now to FIGS. 12-14, the virtual encounter system 10 (FIG. 1) by including the aliasing-substitution processing 17a (FIG. 1), will render one or more frames 180 in the goggles worn by user 14a at location 11a (FIG. 1).

Referring now to FIG. 12, specifically, the user 14a (FIG. 1) will see in the rendered frames 180, user 14b via the surrogate 12b (FIG. 1, not shown in FIG. 12).

Referring now to FIG. 13, the user 14a (FIG. 1) will see in the rendered frames 180, user 14b via the surrogate 12b (FIG. 1 not shown in FIG. 13), and at times without the aliasing-substitution processing 17a (FIG. 1), the user 14a will also see surrogate 13b, when during a session, the surrogate 13b enters the field of view of surrogate 12b, as shown. User 14a at those times sees surrogate 13b, rather than user 15*a*, (FIG. 1) because as discussed above, user 14*a* while interacting with surrogate 12*a* in location 11*a* sees and hears what the surrogate 12*b* sees and hears in location 11*b* via the goggles 20*a*, etc. carried by user 14*a*, as was described in conjunction with FIG. 1.

Referring now to FIG. 14, the user 14*a* (FIG. 1) will see in the rendered frames 180, user 14*b* via the surrogate 12*b* (FIG. 1 not shown in FIG. 14), and at times with the aliasing-substitution processing 17*a* (FIG. 1), the user 14*a* will also see user 15*a* substituted for the surrogate 13*b*, when during a session, the surrogate 13*b* enters the field of view of surrogate 12*b*. While the surrogate 12*b* "sees" surrogate 13*b*, the system 10 executing the alias processing 17*a* replaces the image of surrogate 13*b* in the frame of FIG. 13, with the image of user 15*a* (FIG. 1) using any of the techniques discussed above. Thus, the user 14*a* (FIG. 1) will see in the rendered frames 180, user 14*b*, via the surrogate 12*b* (FIG. 1 not shown in FIG. 14), and at those times when surrogate 13*b* is in the field of view, the user 14*a* will also see images of user 15*a*, which are substituted for the images of surrogate 13*b*.

Figure 15A:
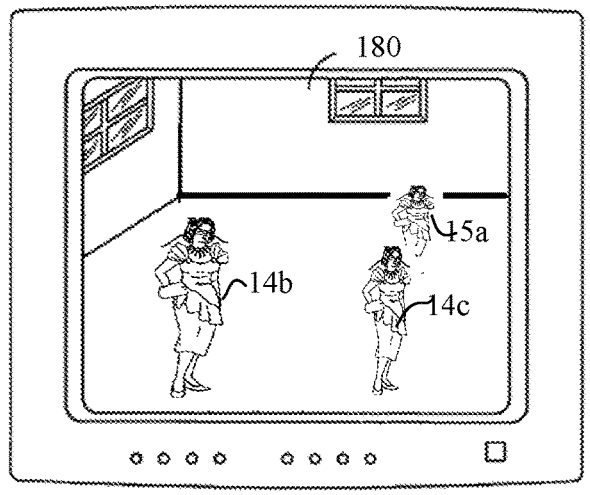
FIGS. 15A and 15B are views of an image as perceived by a user from more than two locations.

Referring now to FIG. 15A, an example with more than two locations is shown. With the described aliasing-substitution processing, as perceived by user 12*a*, user 12*a* will see in the rendered frames 180, user 14*b* via the surrogate 12*b* (FIG. 1 not shown in FIG. 15A), and at times with the aliasing-substitution processing 17*a* (FIG. 1), the user 14*a* will also see user 15*a* substituted for the surrogate 13*b*, when during a session, the surrogate 13*b* enters the field of view of surrogate 12*b*. In addition, a surrogate 15*cc* is replaced by images of its paired user 14*c* that is in a third location 11*c*.

Figure 15B:
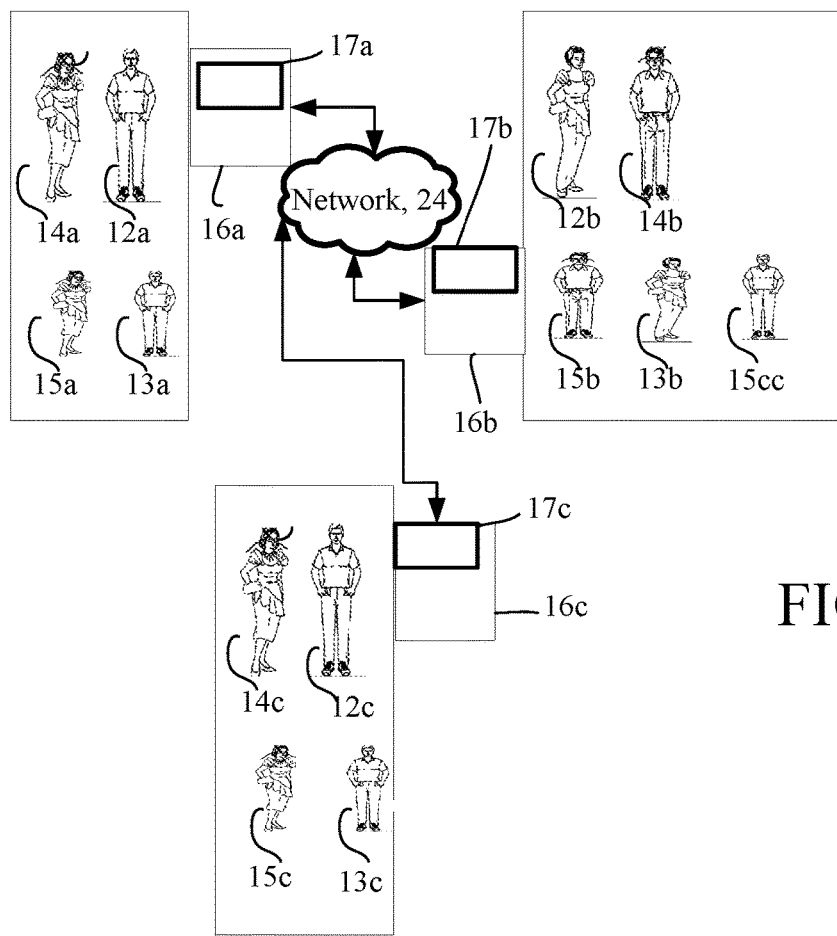

FIG. 15B shows the third location 11*c* in addition to locations 11*a* and 11*b* of FIG. 1, (where the users 14*a*, 14*b* and 15*a*, 15*b* are shown as well as the surrogates 12*a*, 12*b* and 13*a*, 13 are shown). In the third location 11*c* are surrogates 12*c*, 13*c*, and users 14*c* and 15*c* that are similarly outfitted as users 14*a*, 14*b* and 15*a*, 15*b*.

FIG. 15B shows another surrogate 15*cc* in location 11*a*, through which user 14*c* in the third location 11*c*, sees and hears what surrogate 15*cc* sees and hears in location 11*b*, with user 14*c* interacting with surrogate 12*c*. User 14*c* is paired with surrogate 15*cc* and user 14*c* is associated with surrogate 12*c*.

In those instances, when location 11*b* has other surrogates from different locations, the system 10 can execute alias processing 17*c* to replace the images of those other surrogates, i.e., surrogate 15*cc* which could be in the frame of FIG. 15A, with the image of the user 14*c* that is paired with surrogate 15*cc*.

Similar arrangements are provided for perception by any of the users.

In other embodiments, the paired user could be another user in another location (not shown) or an existing user in the session in one of locations 11*a*, 11*b*. That is, a user, e.g., user 14*b* could have two paired surrogates 12*a* and 12*c* in two different locations 11*a* and 11*c* respectively. In this instance, the user 14*a* would select which of the surrogates 12*a*, and 12*c* to interact with during a session and could change the selection during the session or could interact with both. Selection could be made using various techniques such as through a user interface presented to the user via the goggles prior to and/or during a session. However, irrespective of the user's 14*b* selection, the user's paired surrogate in location 11*c* could be replaced by the user's image.

Figure 16:
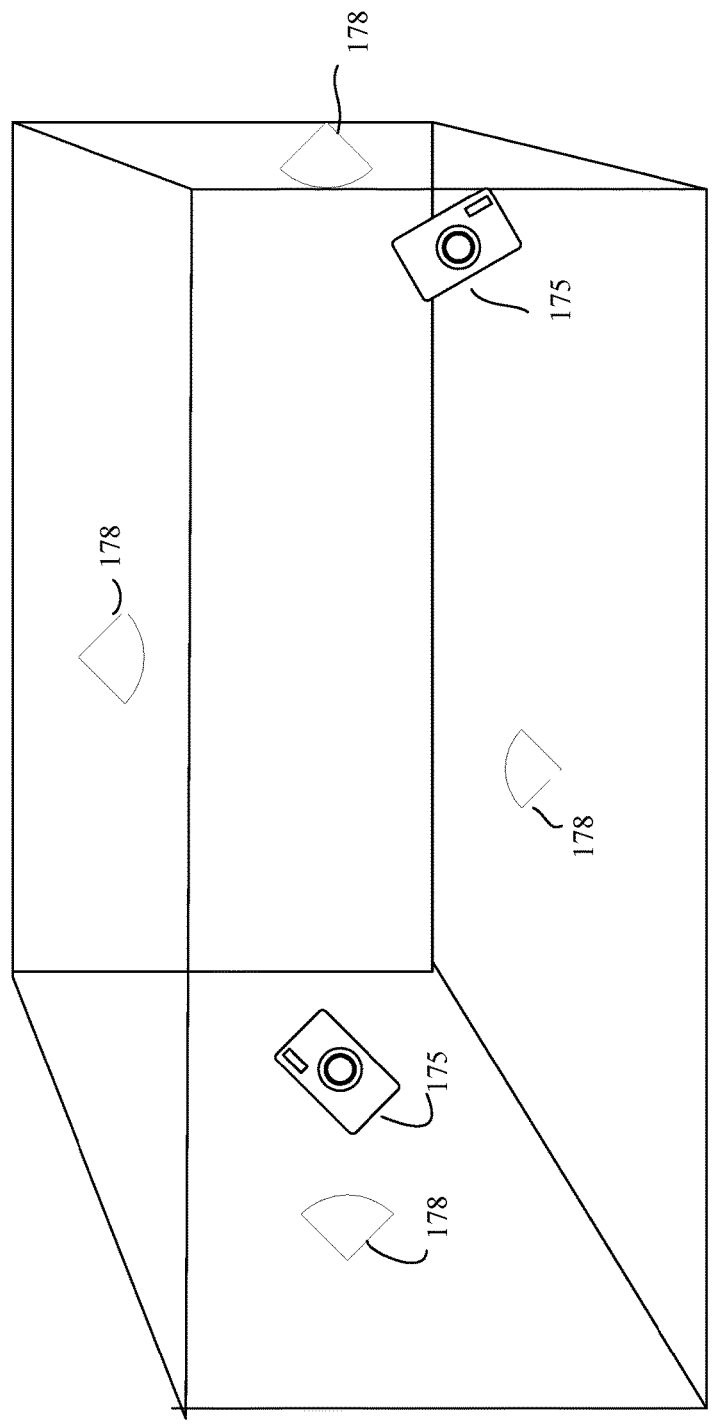
FIG. 16 is a view of a layout for a room, premises, environment, etc. for a virtual encounter.

Referring now to FIG. 16, depicted are beacons 175 and cameras 178 dispersed through a premises in which a multi-user, multi-surrogate virtual encounter can occur. The beacons 175 are arranged so as to capture location data, e.g., typically three would be used, and the cameras 178 are likewise arranged in a premises to capture video from various viewing angles. The exact layout of beacons and cameras will vary according to dimension of the premises or region covered in the virtual encounter, cost, etc.

While eyeglasses or a display device can be used other types of augmenting media devices can be configured to receive the generated image. User devices, e.g., goggles, body suits, etc. can include a computing device capable of taking input from a user and communicating over a network (not shown) with a server and/or with other user devices. For example, user device can be a mobile device, a laptop, a cell phone, a personal digital assistant ("PDA"), as well as the goggles, and so forth. User devices include monitors which render images. Gateways can include server computers that can be any of a variety of computing devices capable of receiving information, such as a server, a distributed computing system, a desktop computer, a laptop, a cell phone, a rack-mounted server, and so forth.

The aliasing-substitution processing modules can be programmed computing devices that are part of the gateway devices or can be separate computing devices such as computers and or server computer systems. Servers may be a single server or a group of servers that are at a same location or at different locations. These server systems can be dedicated systems, e.g., traditional servers and/or virtual servers running in a "cloud computing" environment and networked using appropriate networking technologies such as Internet connections. Applications running on those servers may communicate using XML/SOAP, RESTful web service, and/or other appropriate application layer technologies such as HTTP and ATOM.

Servers receive information from client device user device via interfaces. Specific implementation of interfaces can be any type of interface capable of receiving information over a network, such as an Ethernet interface, a wireless networking interface, a fiber-optic networking interface, and so forth. Servers also include a processor and memory, a bus system including, for example, a data bus and a motherboard, can be used to establish and to control data communication between the components of server.

Processors may include one or more microprocessors. Generally, processor may include any appropriate processor and/or logic that is capable of receiving and storing data, and of communicating over a network (not shown). Memory can include a hard drive and a random access memory storage device, such as a dynamic random access memory, machine-readable media, or other types of non-transitory machine-readable storage devices.

Components also include storage devices configured to store information including data and software. Embodiments can be implemented in digital electronic circuitry, or in computer hardware, firmware, software, or in combinations thereof. Apparatus of the invention can be implemented in a computer program product tangibly embodied or stored in a machine-readable storage device and/or machine readable media for execution by a programmable processor; and method actions can be performed by a programmable processor executing a program of instructions to perform functions and operations of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks, etc. Any of the foregoing can be supplemented by, or incorporated in, ASICs (application-specific integrated circuits).

Other embodiments are within the scope and spirit of the description claims. For example, due to the nature of software, functions described above can be implemented using software, hardware, firmware, hardwiring, or combinations of any of these. Features implementing functions may also be physically located at various positions, including being distributed such that portions of functions are implemented at different physical locations.

What is claimed is:

1. A virtual reality encounter system comprising,
a first surrogate comprising a body and supporting at least one first camera that captures image data from a first physical location in which the first surrogate is disposed to produce a first image signal;
a second surrogate comprising a body and supporting at least one second camera that captures second image data from the first physical location in which the second surrogate is disposed to produce a second image signal;
a processor configured to:
receive the first image signal;
detect an image of the second surrogate in the first image signal;
replace the image data of the second surrogate in the first physical location, with image data of a user in the first physical location to form a transformed image that substitutes the image data of the user for the image data of the second surrogate; and
a user device in a second, different location, with the user device comprising a display, with the display configured to receive the transformed image.

2. The system of claim 1, further comprising:
an adapter to send the transformed image having the replaced image data to a communications network.

3. The system of claim 1 wherein the user device is a set of goggles to render the second video image, which goggles are in the second, different physical location, with the set of goggles including a pair of displays and a transducer.

4. The system of claim 1, further comprising:
a third surrogate supporting at least one third camera that captures third image data from the second, different physical location in which the third surrogate is disposed to produce a third image signal.

5. The system of claim 1 wherein the processor is configured to:
receive image frames from the output of a camera carried by the first surrogate; and
process the image frames to detect the second surrogate in a field of view of the camera by applying data received from electronic compasses attached to the first surrogate and the second surrogate to determine orientations and relative positions of the first surrogate and the second surrogate.

6. The system of claim 1 wherein the processor is configured to:
receive image frames from the output of a camera carried by first surrogate;
processed the image frames to detect the second surrogate in a field of view of the camera by applying recognition processing to determine whether and where in the image the second surrogate appears; and
replace the image of the second surrogate with the image of the user.

7. The system of claim 6 wherein the recognition processing is facial recognition and processor is configured to:
apply facial recognition processing that compares selected features in the image to stored facial features of the second surrogate.

8. The system of claim 1, further comprising:
cameras arranged in the location, and the processor is configured to:
capture in real time a moving digital image of the user moving through the first location using one or more of the cameras arranged in the first location; and
select which camera to supply real-time moving image data to replace the image data of the second surrogate in the first physical location to form the transformed image.

9. The system of claim 8 wherein compass data is used to select the camera to supply the moving digital image.

10. The system of claim 1, further comprising:
cameras arranged in the first location, and wherein the processor is configured to:
determine whether the second surrogate is within a field of view of one or more of the cameras;
determine where in the image frames is the image of the second surrogate; and
generate a modified image that depicts movement of the user substituted for second surrogate in the image frames.

11. The system of claim 1 wherein the surrogates are robots.

12. The system of claim 1 wherein the processor is further configured to:
receive image data as a plurality of image frames of data; and
apply image recognition to the plurality of image frames of data to detect the image of the second surrogate and location of the image of the second surrogate in the plurality of image frames.

13. The system of claim 12 wherein the processor is further configured to:
retrieve image data of the user in the first location;
scale the retrieved image data of the user; and
generate a modified image frame that is transformed by substitution of the image of second surrogate at an identified location in the image frame with the scaled, image of the user.

14. The system of claim 4 wherein the processor configured to detect the image is further configured to:
receive electronic compass data from the first surrogate and the second surrogate, the electronic compass data including orientation and relative position of the first surrogate and the second surrogate; and determining from a field of view of the at least one first camera and the electronic compass data from the first surrogate and the second surrogate, location data of the second surrogate within the field of view of the at least one first camera.

15. The system of claim 14 wherein the processor is further configured to:
   determine based on the received image data and the determined location data, a location of the image of the second surrogate in the image data;
   retrieve image data of the user; and
   scale the retrieved image data to replace the image of the second surrogate by substituting the scaled retrieved image data of the user for the image data of the second surrogate.

16. The system of claim 1 wherein the first and second surrogates are first and second robots, the user device that receives the transformed image is a first user device that receives the transformed image transformed from the image sent by the first robot, and the system further comprises:
   a third robot supporting at least one third camera that captures third image data from the second, different physical location in which the third surrogate is disposed to produce a third image signal;
   a second user device comprising a display and transducer, the third user device disposed in the second location and configured to receive image data from the second robot;
   a third user device comprising a display and transducer, the third user device disposed in the first location and configured to receive image data from the third robot.

17. The system of claim 16, further comprising:
   a fourth robot supporting at least one fourth camera that captures fourth image data from the second, different physical location in which the fourth surrogate is disposed to produce a fourth image signal; and
   a fourth user device comprising a display and transducer, the fourth user device disposed in the first location, and configured to receive image data from the fourth robot.

18. The system of claim 1, further comprising:
   a first computing system in the first location with the first computing system including the processor; and
   a second computing system in the second location, the second computing system connected to the first computing system via a network.

19. A virtual reality encounter method comprises:
   producing by a camera, supported on a first surrogate comprising a body, image data from a first physical location in which the first surrogate is disposed to produce a first image signal;
   producing by a camera, supported on a second surrogate comprising a body, image data from the first physical location in which the second surrogate is disposed to produce a second image signal;
   receiving by a computer system the first image signal;
   detecting by the computer system an image of the second surrogate in the first image signal;
   replacing by the computer system the image data of the second surrogate in the first physical location, with image data of a user in the first physical location to form a transformed image that substitutes the image data of the user for the image data of the second surrogate; and
   receiving by a user device in a second, different location, the transformed image with the user device comprising a display configured to receive the transformed image.

20. The method of claim 19, further comprising:
   sending the transformed image having the replaced image data to the user device over a communications network.

21. The method of claim 19 further comprising:
   receiving audio from the first location, and wherein the user device is a set of goggles to render the second video image, which goggles are in the second, different physical location, with the set of goggles including a pair of displays and an audio transducer that renders the received audio.

22. The method of claim 19 further comprising:
   producing by a camera, supported on a third surrogate comprising a body, image data from the second physical location in which the third surrogate is disposed to produce a third image signal.

23. The method of claim 19 further comprising:
   receiving image frames from the output of a camera carried by first surrogate;
   processing the image frames to detect the second surrogate in a field of view of the camera by applying recognition processing to determine whether and where in the image the second surrogate appears; and
   replacing the image of the second surrogate with the image of the user.

24. The method of claim 23 wherein the recognition processing is facial recognition and the method further comprises:
   applying facial recognition processing that compares selected features in the image to stored facial features of the second surrogate.

25. The method of claim 19 further comprising:
   capturing in real time a moving digital image of the user moving through the first location using one or more cameras arranged in the first location; and
   selecting which camera to supply real-time moving image data to replace the image data of the second surrogate in the first physical location to form the transformed image.

26. The method of claim 19 further comprising:
   arranging cameras in the first location;
   determining whether the second surrogate is within a field of view of one or more of the cameras;
   determining where in the image frames is the image of the second surrogate; and
   generating a modified image that depicts movement of the user substituted for second surrogate in the image frames.

27. The method of claim 19 wherein the surrogates are robots.

28. The method of claim 19 further comprising:
   receiving image data as a plurality of image frames of data; and
   applying image recognition to the plurality of image frames of data to detect the image of the second surrogate and location of the image of the second surrogate in the plurality of image frames.

29. The method of claim 19 further comprising:
   retrieving image data of the user in the first location;
   scaling the retrieved image data of the user; and
   generating a modified image frame that is transformed by substitution of the image of second surrogate at an identified location in the image frame with the scaled, image of the user.

30. The method of claim 19 wherein the first and second surrogates are first and second robots, the user device that receives the transformed image is a first user device that receives the transformed image transformed from the image sent by the first robot, and the method further comprises:

producing by a camera, supported on a third robot comprising a body, image data from a second physical location in which the third surrogate is disposed to produce a third image signal.

31. A computer program product stored on non-transitory hardware storage devices, the computer program product comprises instructions to cause a machine to:

receive a first image signal from a first camera that captures image data from a first physical location in which a first surrogate is disposed;

detect an image of a second surrogate in the first image signal;

replace the image data of the second surrogate in the first physical location, with image data of a user in the first physical location to form a transformed image that substitutes the image data of the user for the image data of the second surrogate;

receive image frames from the output of the camera carried by the first surrogate; and process the image frames to detect the second surrogate in a field of view of the camera by applying recognition processing to determine whether and where in the image the second surrogate appears; and replace the image of the second surrogate with the image of the user.

32. The product of claim 31 wherein the recognition processing is facial recognition and the product further includes instructions to:

apply facial recognition processing that compares selected features in the image to stored facial features of the second surrogate.

33. The product of claim 31 further includes instructions to:

capture in real time a moving digital image of the user moving through the first location using one or more of the cameras arranged in the first location; and select which camera to supply real-time moving image data to replace the image data of the second surrogate in the first physical location to form the transformed image.

34. The product of claim 31 further includes instructions to:

determine whether the second surrogate is within a field of view of one or more cameras;

determine where in the image frames is the image of the second surrogate; and generate a modified image that depicts movement of the user substituted for second surrogate in the image frames.

* * * * *